S. Z. DE FERRANTI.
PROCESS FOR ELECTRICALLY WELDING TURBINE BLADES.
APPLICATION FILED MAY 14, 1904.
1,148,221.
Patented July 27, 1915.
3 SHEETS—SHEET 1.
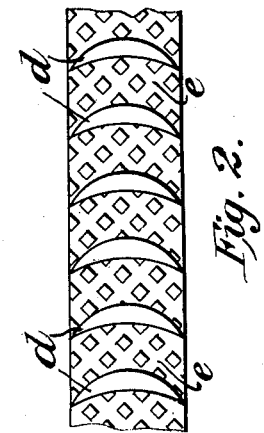
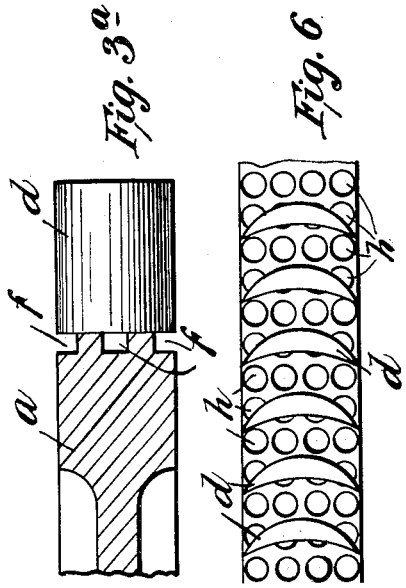
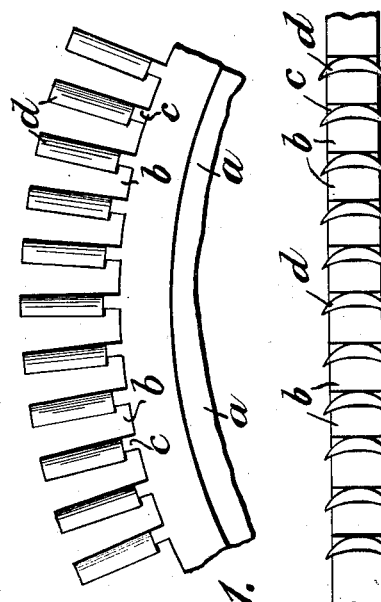
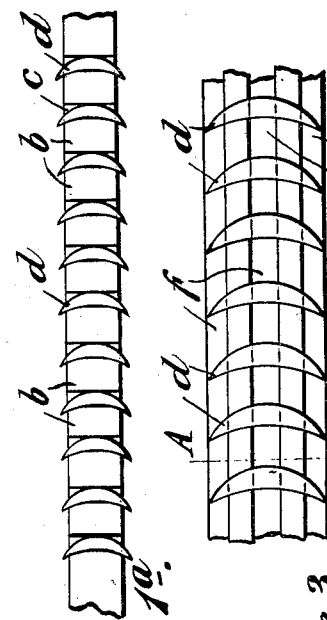
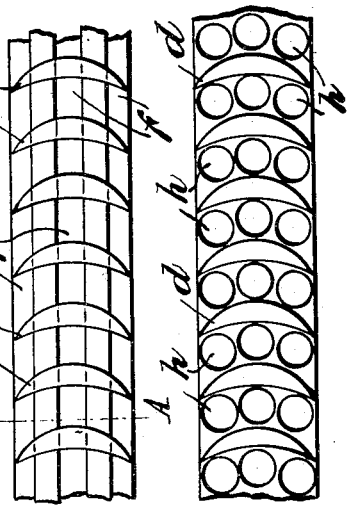
INVENTOR.
SEBASTIAN Z. DE FERRANTI
BY Spear, Middleton, Donaldson & Spear
ATTYS
ATTEST.
Edward Sarton

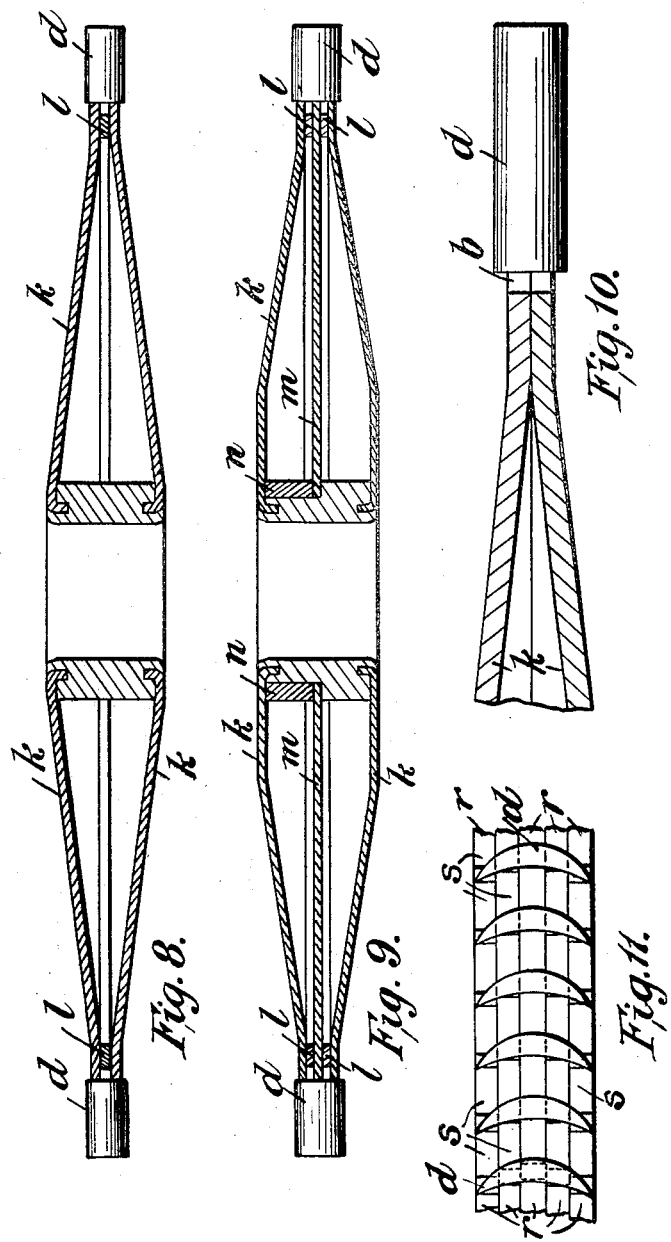

S. Z. DE FERRANTI.
PROCESS FOR ELECTRICALLY WELDING TURBINE BLADES.
APPLICATION FILED MAY 14, 1904.
1,148,221.
Patented July 27, 1915.
3 SHEETS—SHEET 3.
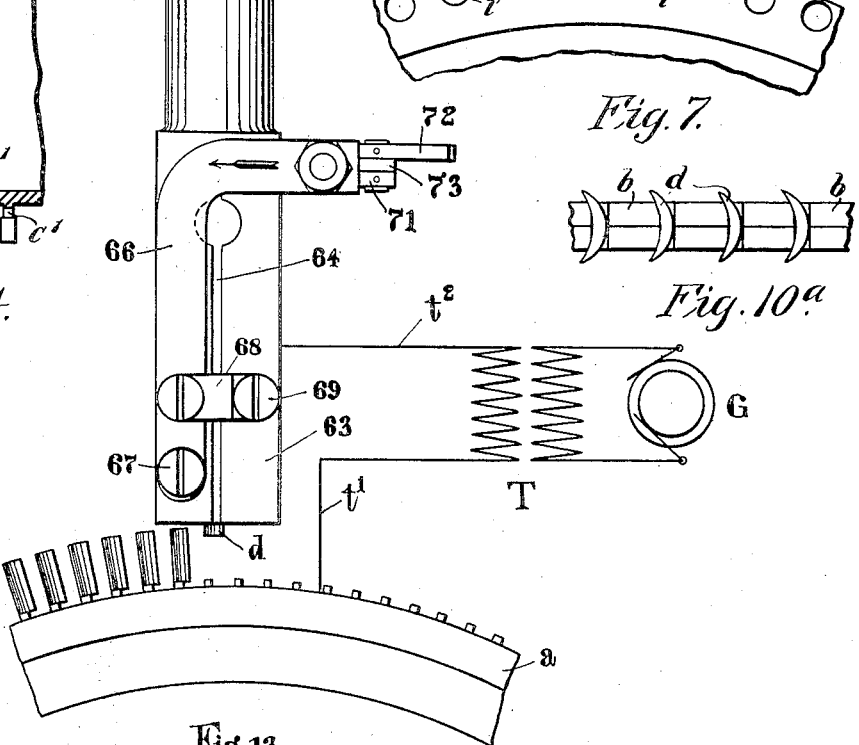

UNITED STATES PATENT OFFICE.

SEBASTIAN ZIANI DE FERRANTI, OF HAMPSTEAD, LONDON, ENGLAND.

PROCESS FOR ELECTRICALLY WELDING TURBINE-BLADES.

1,148,221. Specification of Letters Patent. Patented July 27, 1915.

Application filed May 14, 1904. Serial No. 208,034.

*To all whom it may concern:*

Be it known that I, SEBASTIAN ZIANI DE FERRANTI, a subject of the King of Great Britain and Ireland, and residing at 31 Lyndhurst road, Hampstead, London, N. W., England, have invented a certain new and useful Process for Electrically Welding Turbine-Blades, of which the following is a specification.

The invention relates to the electrical welding of turbine blades on to the wheels, rings or drums carrying them and has for its object to overcome the difficulties which have been experienced in electrically welding together two such parts differing considerably as regards their power of rising to the required welding temperature when heated at the point of junction, so that blade carrying elements with welded blades may be reliably produced in an inexpensive manner.

The main difficulty arises through the blades and their carriers differing as regards their power of conducting heat away from the welding point.

In the welding of a turbine blade to the carrier to which it is to be secured, it is found that the comparatively large volume of metal forming the carrier, rapidly conducts heat away from the welding point thus preventing the temperature of the carrier rising to the required extent and causing an unsatisfactory weld.

The invention, therefore, consists broadly in adjusting the volume of the blade carrying element in the neighborhood of the welding point so that approximately equal heating occurs in both faces to be welded.

Referring to the accompanying drawings which, with the exception of Figure 4, show the invention applied, by way of example, to a type of parallel flow turbine in which the blades are mounted on the edge of a wheel like body, Fig. 1 is a part side elevation of such a wheel having cross grooves, Fig. 1ª being an edge view; Fig. 2 shows a similar edge view of a modification in which sets of intersecting grooves are adopted; Fig. 3 shows an edge view of a form having circumferential grooves, Fig. 3ª being a section on the line A A of Fig. 3; Fig. 4 shows, in longitudinal sectional elevation, part of a drum carrier to which the blades are welded in accordance with one form of the invention; Figs. 5 and 6 show edge views of modifications in which holes are bored radially into the edge of the disk, while Fig. 7 is a part side elevation in which holes are bored through from face to face of the disk; Fig. 8 shows a sectional plan of a form of wheel built up of two dished disks, held apart at their circumferential portions by distance pieces, Fig. 8ª being a partial edge view to a larger scale; Fig. 9 is a similar sectional plan of a modified form of wheel built up of three disks, while Fig. 9ª is a corresponding partial edge view also to a larger scale; Fig. 10 shows a part sectional elevation of a wheel built up of two comparatively thick disks having notched edges, Fig. 10ª being a partial edge view, while Fig. 11 shows an edge view of a form of wheel built up of a series of "stepped" laminæ and Figs. 12 and 13 show a form of clamp and a diagram of the electrical connections.

(It will be seen that all the edge views in the preceding figures are shown as developments for clearness of drawing and not as true projections.)

The same reference symbols are, when possible, used in the accompanying drawings to denote similar parts.

In carrying out the invention according to the form shown in Figs. 1 and 1ª, the turbine wheel or disk is shown at $a$, cross grooves, $b$, being cut in its circumferential edge so as to leave projecting portions of metal, $c$, to which the turbine blades, $d$, are welded. The same object is attained by cutting two intersecting sets of grooves, $e$, in the edge of the disk, as is shown in Fig. 2, or by cutting circumferential grooves, such as $f$, completely around the edge (see Figs. 3 and 3ª.)

Fig. 4 shows the invention according to one form applied to the case of a drum blade carrier, $a'$; the drum is grooved circumferentially with grooves, $f'$, the intervening collars of metal being then cross-cut to form projecting teeth, $c'$, on which the blades are welded.

According to a modified form, radial holes, $h$, may be bored a short distance into the edge of the disk, these holes being either arranged in patterns so as to leave intervening projections of untouched metal to which the blades may be welded as shown in Fig. 5, or arranged without particular reference to the position of the blades, (see Fig. 6).

In Fig. 7, a method is shown of removing metal in the neighborhood of the welding point by boring holes, *i*, through (or partly through) from face to face of the disk at a radius slightly less than that of its outside edge. The object to be kept in mind in this as in other modifications, is to remove sufficient metal to enable the temperature to rise to the welding point as explained above, while at the same time leaving sufficient areas untouched to insure the mechanical strength in the welded joint.

Referring now to Figs. 8 and 8ª, a form of wheel is shown somewhat diagrammatically which is built up of two dished disks, *k*, of comparatively thin metal, held apart at their circumferential portions by one or more distance pieces such as *l*, disposed at a radius somewhat less than the maximum radius of the disks, the blades, *d*, being welded in position on their outside edges.

Figs. 9 and 9ª show a type of wheel generally similar to that last described but having an intermediate plane disk, *m*, in addition to the two dished disks, *k*; a portion, *n*, of the hub, *o*, is in this case made detachable so as to allow the different parts of the wheel to be assembled. Distance pieces, *l*, are indicated as before but any other convenient method of holding the disks in their correct relative position may be adopted.

In every case it will be seen that those portions of the carrier to which the blades are to be welded are partially isolated from the body of the carrier by slots, holes and so forth so as to limit the cross-sectional area available for the conduction of heat, and so compel the carrier to rise to the welding temperature. On the other hand to prevent the blades being burnt away, their mass is artificially increased by holding them between clamps or jaws of high heat conductive material such as copper. Thus referring to Figs. 12 and 13, the jaw holder 63, is separated into two branches by means of the slot, 64, each branch carrying a copper jaw, 65, shaped so as to clear adjacent blades. Between the jaws, 65, the blade to be welded is clamped, so as to leave the tip only exposed as seen in Fig. 13, and in order to insure a good contact and rigid holding of the blade in the jaws, a clamping device is preferably arranged in addition to that provided by the spring of the two branches of the jaw holder.

According to the form shown links, 66, are pivoted at 67, to one branch of the jaw holder, while short cross links, 68, connect the links, 66, to the other branch to which they are pivoted at 69. The long links, 66, are curved as shown, and are connected at their non-pivoted ends by the cross-piece, 70, to which pressure to clamp the blade is applied in the direction of the arrow (see Fig. 13) by means of the cam, 71, and the hand lever, 72, both of which are secured to a common axle rotatably mounted on any convenient support, 73. A spring such as 74, serves to return the links when the blade is released.

The necessary electrical connections to affect the welding are shown diagrammatically in Fig. 13, in which G represents an appropriate source of alternating current, and T, a transformer. It will be seen that while the lead, *t'*, may be connected directly to the carrier *a*, as in the example shown, it is necessary on the other hand that current to the blade, *d*, should be conveyed indirectly by way of the jaw holder, 63, and lead, $t^2$.

In Figs. 8 and 9, the dished disks, *k*, are indicated as secured to the hubs, *o*, by pressing the inner edges of these disks into grooves and subsequently burring over the hubs to hold the disks in place.

In the modification shown in Figs. 10 and 10ª, two dished disks, *k*, are again employed but of thicker metal, their circumferential portions being brought into contact and cross grooves, *b*, being cut in their edges in accordance with the method described above with reference to Figs. 1 and 1ª. Again, that portion of the disk carrying the blades may be built up of a set of thin laminæ, *r* (see Fig. 11) the edges of which are notched as at *s*, the laminæ being assembled in such a way that the notches, *s*, are "stepped" with regard to each other, so that the intervening projections of metal may follow the shape of the turbine blades to be welded to them.

Instead of notching the laminæ, they may be prepared in accordance with other of the methods pointed out above, before being assembled in the manner indicated.

In an invention such as the present, it is not practicable to describe every method of carrying its broad underlying principle into effect, but the scope is sufficiently indicated by the many examples given above and moreover it will be evident without further description, how the invention may be applied to the welding together of turbine blades and carriers of other forms than those described above by way of example.

The electric heating current is passed directly through the carrier and by way of clamps through the blades.

By means of my invention it will be seen that the blades are attached to their carrying elements in an expeditious and efficient manner while in the case of rotors a still further advantage is obtained over the methods of blading commonly employed inasmuch as if properly carried out the attachment of the blades by electric welding introduces no change of symmetry with respect to the axis of rotation and consequently dispenses with the tedious operation of balancing otherwise rendered necessary.

Having now described my invention what I claim as new and desire to secure by Letters Patent is:—

1. The method of attaching turbine blades to their carrier of relatively great mass which consists in adjusting the heat capacity of the localized area of the carrier at the point of attachment by partially isolating these areas from the remainder of the carrier so that a welding temperature may be reached notwithstanding the cooling effect of the mass of the carrier, and passing a uniform electric heating current directly through the carrier and by way of the clamps through the blades to weld the blades in succession to the carrier, substantially as described.

2. The method of attaching turbine blades to their rotor carrying elements one by one, consisting in equalizing the heat capacity of the welding parts by limiting the conducting areas of the carrier at the points of blade attachment symmetrically in relation to the axis of rotation of the rotor, and inclosing the blades between clamps so that on heating locally by a uniform electric current, the blades and carrier rise to approximately the same temperature on welding the blades to the carrier so prepared, substantially as described.

3. Process for the attachment of turbine blades to their carriers consisting in partially isolating those portions of the carrier in the neighborhood of the points of attachment of the blades, to limit the cross-sectional area available for the conduction of heat therefrom; artificially increasing the volume of the blades by contacting them with metal masses of high heat conductive capacity and finally welding together the carriers and blades so prepared.

4. Process for the attachment of turbine blades to their carriers, consisting in forming circumferential grooves with intervening rings of metal around the carrier thereby limiting the cross sectional area available for the conduction of heat from the point of attachment so that on heating locally, said blade and said carrier rise to approximately the same temperature and welding each blade to a plurality of said rings, as set forth.

5. The method herein described of constructing a turbine wheel, ring or drum, the same consisting first in forming said wheel symmetrically in relation to its center of rotation with the parts next to the welding points reduced to properly conform to the volume of the blades and electrically welding said blades at the said points whereby the symmetry of the wheel is maintained.

In witness whereof I have hereunto set my hand in presence of two witnesses.

SEBASTIAN ZIANI DE FERRANTI.

Witnesses:
 FRANCIS JAMES BIGNELL,
 WALTER J. SKERTEN.